Figure 6:
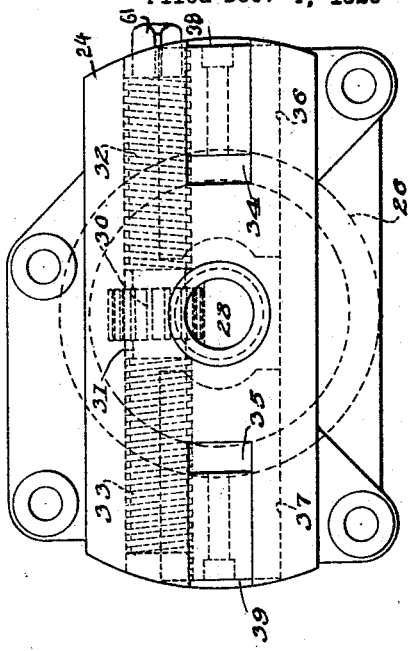

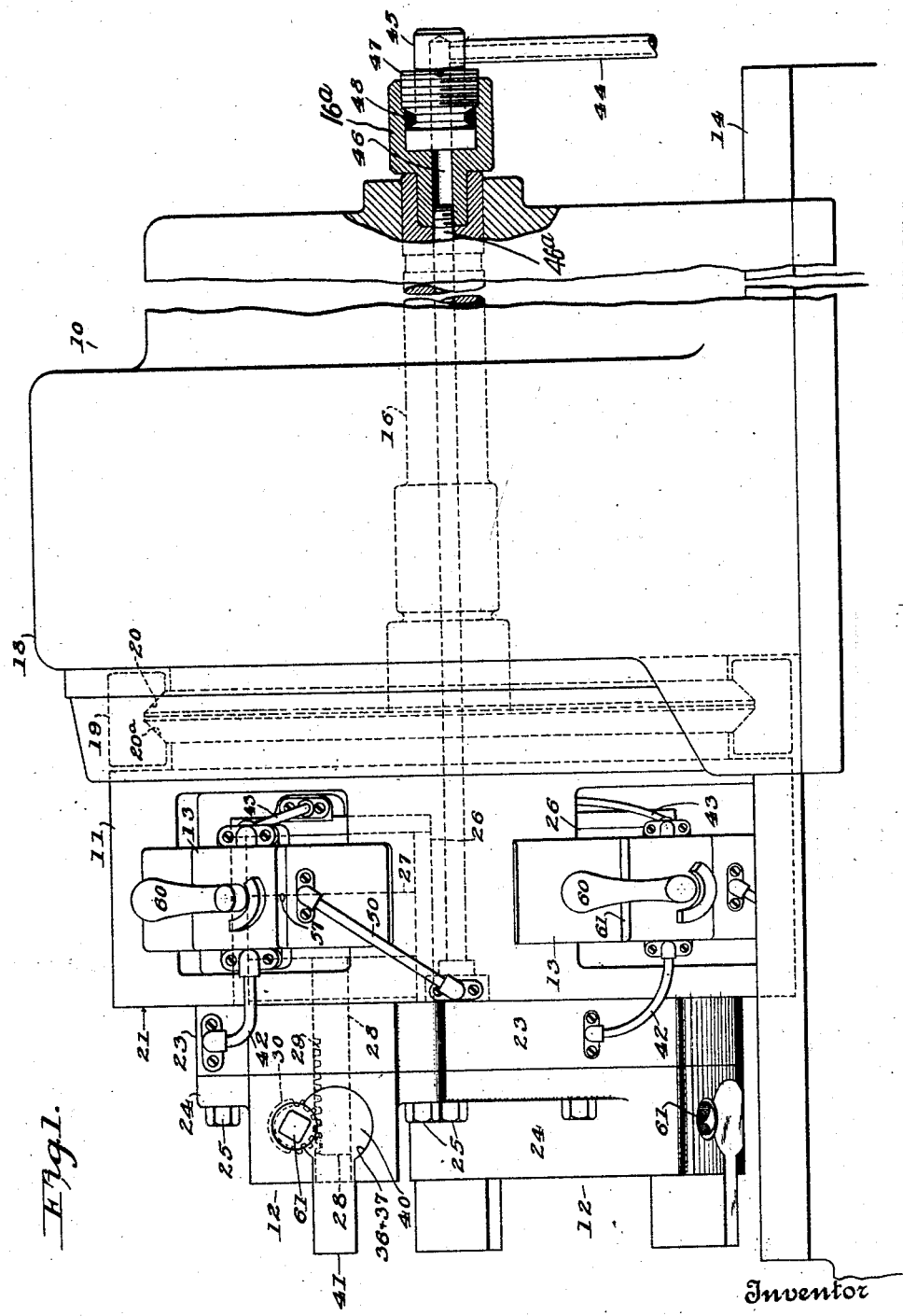

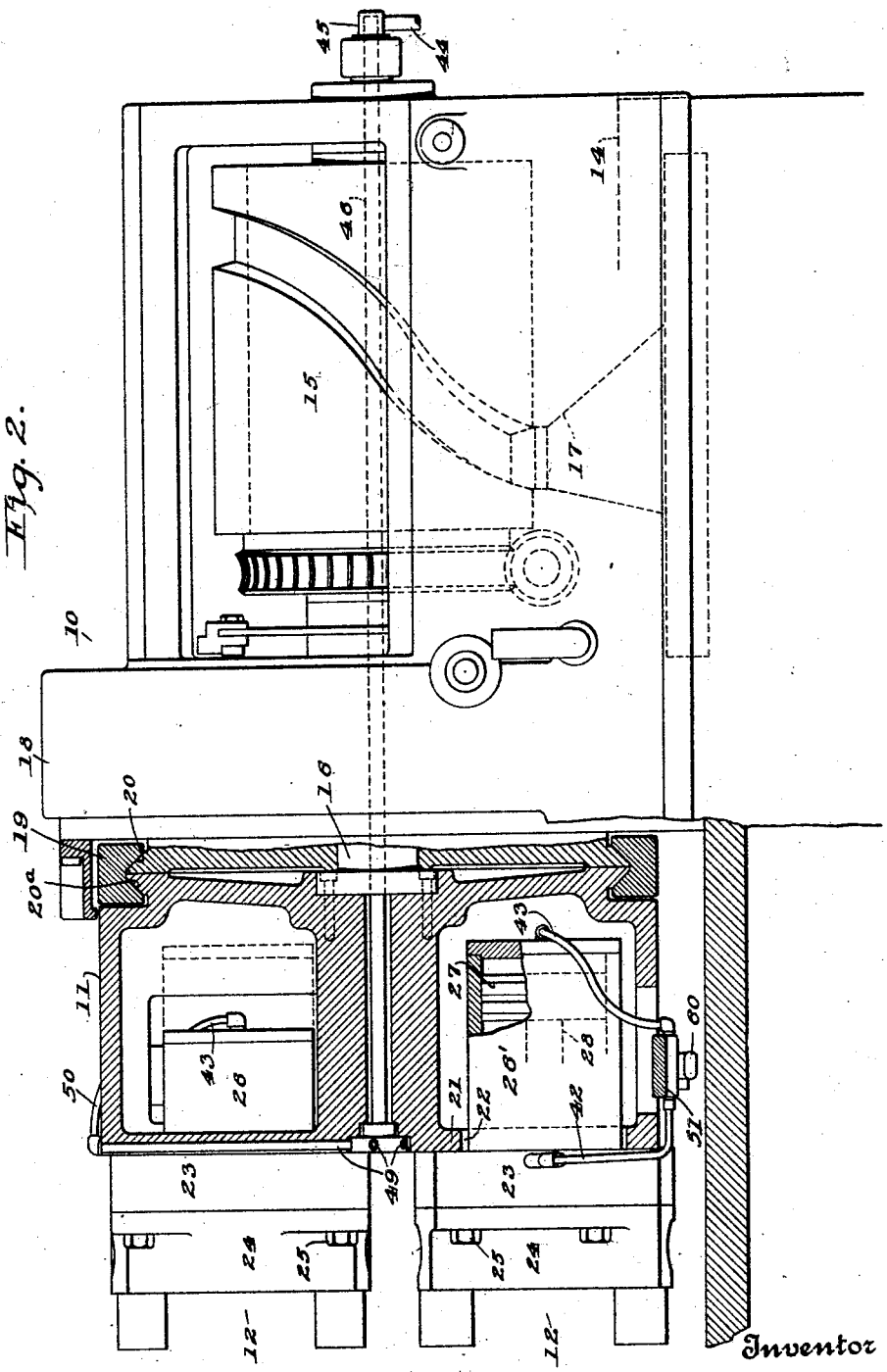

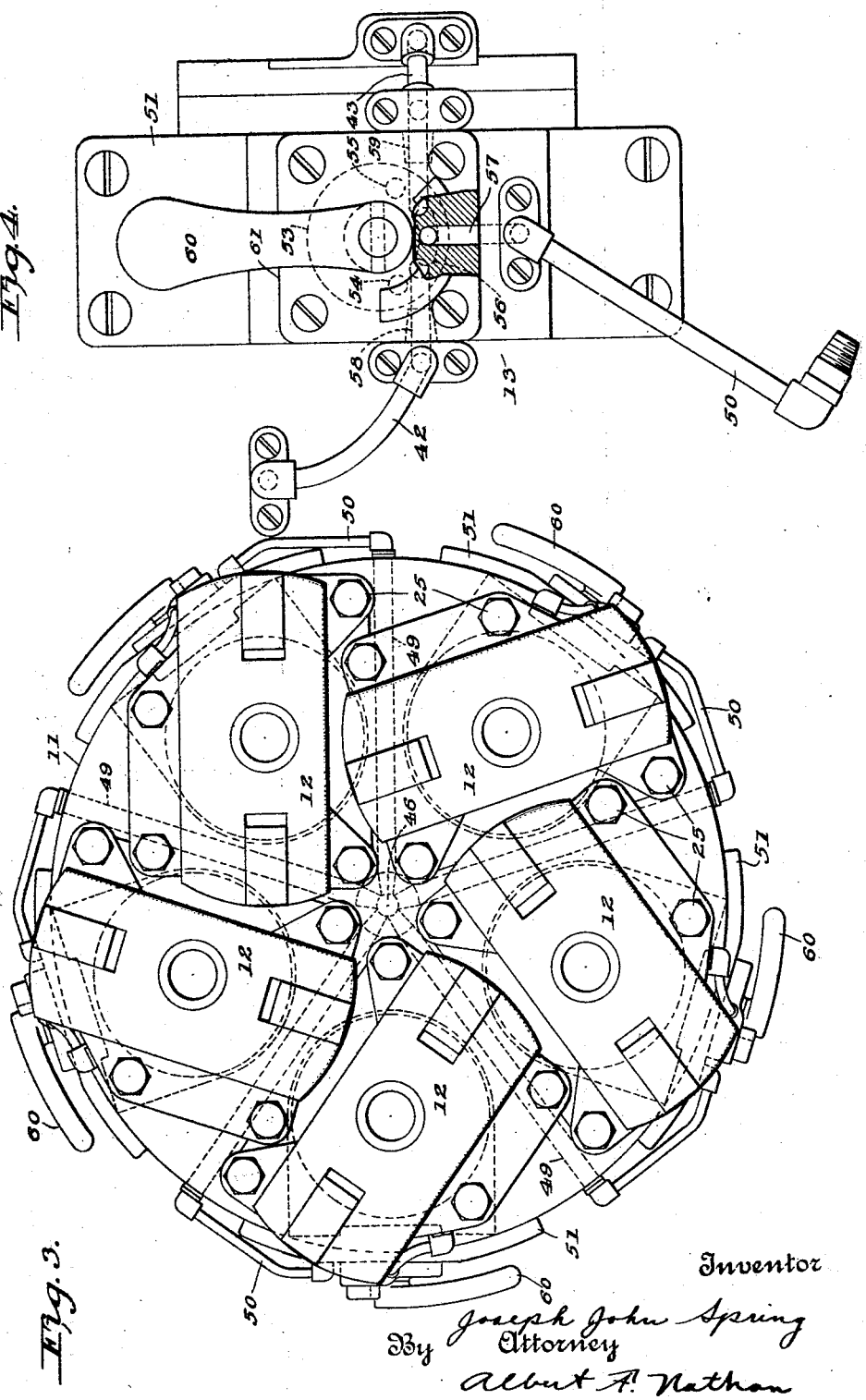

June 16, 1931. J. J. SPRING 1,810,300
MULTIPLE SPINDLE CHUCKING MACHINE
Filed Dec. 4, 1926 4 Sheets-Sheet 4

Inventor
Joseph John Spring
By Attorney
Albert F. Nathan

Patented June 16, 1931

1,810,300

UNITED STATES PATENT OFFICE

JOSEPH JOHN SPRING, OF NEW BRITAIN, CONNECTICUT, ASSIGNOR TO THE GOSS AND DELEEUW MACHINE COMPANY, OF NEW BRITAIN, CONNECTICUT, A CORPORATION OF CONNECTICUT

MULTIPLE SPINDLE CHUCKING MACHINE

Application filed December 4, 1926. Serial No. 152,526.

The invention relates to metal working machines of multiple spindle type generally known as multiple spindle chucking machines. In this type of machine there are a number of spindles in one head, each spindle containing a rotatable tool therein for acting simultaneously on corresponding pieces of work held in their respective chucks in another head arranged in opposed relation thereto so that translation of one head causes the simultaneous engagement of tools with the corresponding element to be machined. Upon the completion of one operation one of the heads, in this case the chuck carrying head is withdrawn and given a partial rotation or indexed to bring the parts to be machined opposite a different tool. More specifically the invention relates to the means of applying the chucks to the turret or index head, the chuck operating means and to the general arrangement of the related structure.

The adjustable holder for the stock to be machined commonly called the chuck was at first operated manually, one common construction being two or more jaws attached to a screw which upon being manually rotated brought the jaws into clamping position on the stock.

The development of fluid pressure transmissions and operating means gradually led to its application to the operating of various elements of machine tools. It proved to be an excellent means for translating such members as reciprocatory lathe heads. The advantages of fluid transmission of power eventually led to its utilization as a means of operating a single chuck thereby resulting in a power transmitting device which had a steady motion without jerking or jarring and sufficiently positive in its action to firmly grasp the stock yet impositive to the extent that it would give before breaking mechanical parts. The ease with which it could be controlled by a simple valve resulted in a great saving of time and labor and increased output of the machine, a factor of prime importance in production work.

The various and successful adaptations of the fluid pressure means to the operation of single chucks on rotary heads led to the discovery of means whereby a plurality of chucks located on an index head could be operated by the fluid pressure means. The fluid pressure was brought in through a central rotary shaft and radial branch passages conducted it to valves on the periphery which controlled the application of the fluid to a piston connected to actuate the chuck jaws. Such machines, however, while having the advantages of fluid pressure operating means have been large and cumbersome and complicated in structure, and with various projecting elements liable to catch on clothing and requiring a larger clearance between the turret and lathe bed.

Another serious defect has been the limited range of the movement of the chuck jaws. Where the jaws are operated by a piston the amount of movement of the jaws is necessarily determined and limited by the length of stroke of the piston. While with some work it may be desirable to move the jaws but a short distance; in other types of work it may be necessary that the jaws receive a large movement as e. g. if the stock has an overhanging flange. The jaws have been made manually adjustable in addition to the fluid pressure means but no provision has heretofore been made for changing the range of operation which can be obtained from a single piston stroke.

Another objection to the mchines previously invented and which objection arises from their cumbersome, complicated structure is the lack of means for readily replacing individual fluid pressure operated chucking units in case either, of a desire to use a chuck with a different range of operation or for some other reason such as breakage.

It is one of the objects of the present invention to provide a turret such as to enable the ready removal of a chuck and its operating means. This is accomplished by making the chuck and its operating means a single, compact, integral unit, with convenient and simple means for its quick attachment or removal.

Another object of this invention lies in the provision of means whereby units of different sizes may be substituted. As herein shown such means comprises a chucking unit which includes a cylinder with a piston therein for operating the chuck. The cylinders may be made of different lengths with a corresponding change in the length of the piston rod if necessary thereby providing a longer or shorter stroke with a corresponding long or short range of operation of the jaws. Such change may be effected by substituting a different cylinder and piston rod in the unit after it is removed or by using an entirely different unit. The turret is made of such dimensions as to readily accommodate various length cylinders.

A further object lies in the construction of the valve control means and their arrangement on the periphery of the turret in such a manner that they may be convenient to the operator and yet not form projections upon which the operator's clothes or other objects may be caught. The valves are constructed to conform with the peripheral surface of the turret and are semi-built-in thereby resulting in a compact turret requiring a minimum of clearance and reducing the size of the machine.

Still further objects are to be found in the general simplified, compact structure of the turret resulting in a turret which provides for ready accessibility and removal of parts but one which is nevertheless rigid and strong and of comparatively light weight.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 7:
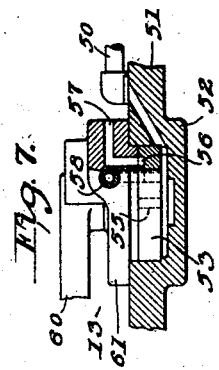
Figure 5:
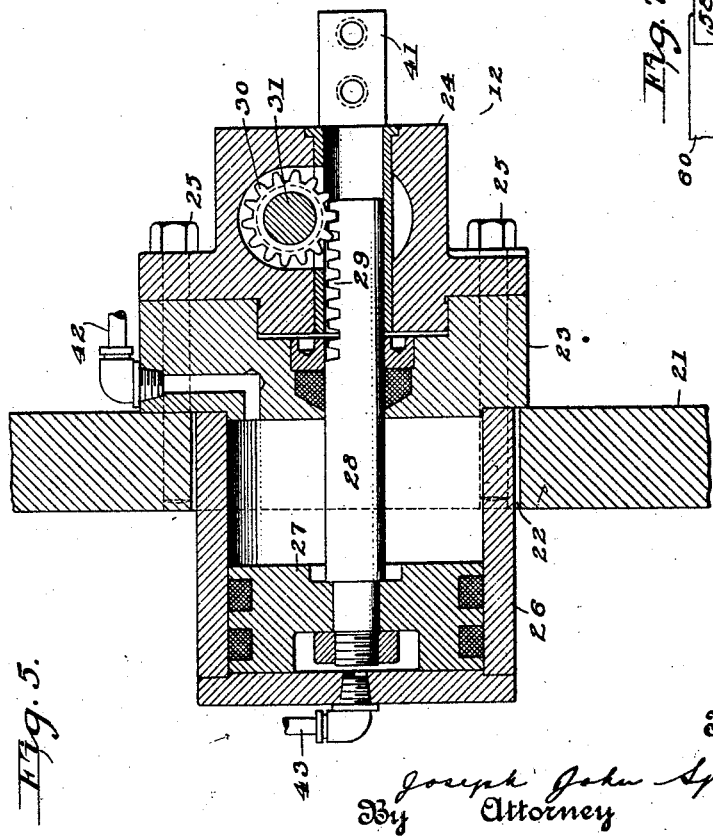

Figure 1 is a view in elevation showing one end of a machine tool having an indexing head thereon in which this invention is incorporated. Fig. 2 is a view similar to Fig. 1 but shows operating means for translating the head and showing the turret in cross section. Fig. 3 is a view of the turret taken in elevation looking from the left of Fig. 1. Fig. 4 is a detail view of a valve control unit. Fig. 5 is a detail view in cross section of one of the chucking units. Fig. 6 is an end view thereof looking from the right in Fig. 5. Fig. 7 is a detail view of one of the control valves.

The invention is shown incorporated in a turret head 10 having in connection therewith an index turret 11 having thereon a plurality of chucks 12 and also having on the periphery of said turret the valves 13 of which there is one for each chucking unit.

The head 10 is adjustable along the ways 14 and has means for imparting a reciprocatory motion thereto shown generally in Fig. 2 as a rotary cam 15 attached to the central shaft 16 which rotates the turret. The cam engages with a fixed dog 17 thereby causing the reciprocation of the head.

Enclosed in the housing 18 are positioned means for locking the turret and rigidly holding it after having received an indexing motion, such means comprising a member 19 which may be contracted into engagement with a non-rotatable surface 20 and the surface 20ª attached to the turret to rotate therewith. Contraction of the member 19 brings these two surfaces into engagement and thereby serves as a locking means.

The means for indexing the turret, that is giving it a step-by-step motion, is not shown and it is to be understood that any such well-known means may be used.

The general construction of a machine tool such as is here partially shown would be comprised of a head mounted in opposed relation to the head 10 and having thereon a plurality of rotatable spindles carrying tools to engage with stock mounted in the respective chucks. Upon the withdrawing of the head 10 to the right the indexing mechanism operates to advance the turret one step whereby when the head 10 is again advanced the stock is brought into such relation as to be operated upon by the next successive tool.

It is also to be understood that the means for reciprocating the head and turret as well as the means for clamping the turret in any one position may be varied to suit the occasion, the specific means herein disclosed forming no part of the invention.

The turret will now be described more in detail. As shown best in Fig. 2 it comprises a cylindrically shaped rotary member which is substantially hollow but having reinforcing members therein where it is desired to strengthen the general construction.

The turret has a working face 21 in which are a plurality of openings 22 adapted to receive chucking units. The numbers of these chucking units may be varied to suit the requirements of the work, five of these being shown in the present case.

Fig. 2 shows that the turret has a thickness which may be greater than the ordinary requirements of such a machine to accommodate various sized actuating means for the chucks as will be described more in detail hereinafter.

The details of each chuck are somewhat as follows and comprise a main plate 23 having bolted thereto the plate 24 by means of the screw bolts 25. These bolts 25 pass entirely through both members 23 and 24 into the face plate 21 of the turret.

These bolts constitute the entire supporting means for each chucking unit and provide easy means of attaching or removing the individual units from the turret.

This idea of constructing the chucking means and its accompanying operating means in one compact unit whereby it may be readily attached to or removed from the turret without disturbing the surrounding structure is one of the main features of this invention.

The operating means for each chuck comprises a cylinder 26 attached to the plate 23 and having therein a piston 27 to which is connected the piston rod 28 having at the opposite end of the piston rod the rack teeth 29 for engagement with the rack gear 30.

The gear 30 is rigid with and mounted on shaft 31. The shaft 31 is provided with the screw threads 32 and 33 having an opposite pitch for a purpose to be disclosed hereafter. The member 24 has therein two rectangular openings 34 and 35, extending into the substantially cylindrically shaped openings 36 and 37, respectively, such openings providing guideways for the chuck jaws 38 and 39. Each chuck jaw has a cylindrical portion 40 mounted to slide in the respective opening 36 or 37. The extensions 41 are for the purpose of engaging the stock. The cylindrical portions 40 have on one side thereof segmental teeth for engagement with the right and left screw threads 32 and 33 whereby reciprocation of the rack 29 imparts a rotary motion to the shaft 31 and thereby moving the chuck jaws 34 and 35 simultaneously either toward or away from the center of the chuck.

By the use of the screw thread 32 or 33 engaging with its respective nut 40 a self-locking chuck is obtained. That is once the chucks are moved by fluid pressure applied to the piston the jaws are locked in position even though the pressure is withdrawn from the piston by reason of the fact that the action of the screw thread and its nut is not reversible to permit the nut to rotate the shaft 31. The above construction of the jaws and gearing has been found desirable in constructing these units. However, it is to be understood that the invention is not concerned with the specific jaw shown as, for example, the chuck may have three or even more jaws or any other construction well known in the art.

The means for admitting fluid pressure into the immediate cylinder comprises the detachable pipes 42 and 43 through which fluid pressure is forced in a manner to be later described.

One of the most important features of this invention consists of the various lengths of cylinders 26 which may be used to comply with the requirements in connection with which the machine is used. In the ordinary construction of such turret mechanism and chucking means the range or movement of the jaws is limited or determined by the length or stroke of the piston which in turn is limited by the length of the fluid pressure cylinder. Often, however, it is desired to operate the jaws through a wider range without having to resort to disassembling of the mechanism or to manual adjustment thereof. For example, it may be desired to use the chuck alternately for external and internal chucking but with the ordinary cylinder the range of movement by the fluid pressure means might be too small to allow for chucking in both directions. Such an operation, however, may be accomplished by the use of a longer cylinder such as is shown in Fig. 2 at 26'. Again for quantity production it may be desired that the piston in completing a stroke moves the jaws only a short distance. Such a cylinder is shown at 26 in Fig. 2. In production work since every second counts the short cylinder could be often used to advantage in that less time would be required to bring the jaws into engagement with the work. Or for certain types of work it may be necessary that the piston rod 28 be given a short stroke so as not to project beyond the plate 24 as shown in Fig. 5. It can be seen that a machine so constructed as to permit of substitution of chucks having a larger or smaller range of operations would be highly desirable. Applicant's construction provides means for accomplishing this object in a very efficient and a simple manner. Fig. 2, for the purpose of illustration, shows one cylinder 26 which may be termed the normal length and one cylinder 26' which may be used for special work. Ordinarily, however, in an indexing mechanism where the stock in each chuck is the same, units of the same size would be used.

It is to be noted that one very simple means of varying the size of the units would be simply to change the length of the cylinder 26 which is readily detachable from the plate 23 and also to substitute a piston rod 28 which would be of a length in accordance with the new cylinder. However, these units of different sizes may be, all assembled, as shown in Fig. 5, for quick application to the turret head whenever it is desired to change the units.

The removal of a chuck unit is easily accomplished merely by removing the screw bolts 25 and detaching the pipe connections 42 and 43 from the cylinder, or, if desired, the pipe 43 may be detached from the valve and made a part of the chuck unit with a length corresponding to the length of the respective cylinder.

The above described construction and arrangement of the turret and chucks coact to accomplish simultaneously two of the main objects of this invention. That is, the ready removal and interchangeability of the various chuck units and the provision whereby chucks having a greater or smaller range of operation may be substituted. These features are both accompanied by the resulting turret which is of a very compact and strong construction and one which requires a minimum of clearance between the spindle and the guides or bed plates 14.

It is to be understood that the specific turret herein disclosed is not limited in its application to the particular indexing mechanism but on the other hand may be used in any type of machine requiring a rotary turret with a plurality of chucks thereon.

The means for leading the fluid pressure to the various chucks will now be described and comprise first a main inlet at 44 for the particular pressure fluid which it is desired to use. This fluid may be hydraulic fluid or an elastic fluid such as air which is ordinarily piped through a factory. The pipe 44 since in the present construction the shaft 16 to which it is attached reciprocates back and forth, is provided with a flexible connection (not shown) to the source of fluid. The pipe 44 is connected to the non-rotatable portion 45 having a passage leading therethrough to communicate with the central passage 46 of head 16$^a$ rigid with the shaft 16. The pipe 46$^a$ centrally mounted within the shaft 16 leads to the opposite end for distribution to the individual chucks. An adjustable packing nut 47 is shown in the end of the head 16$^a$ accompanied by the packing 48 to prevent leakage. The left end of the axial passage 46$^a$ communicates with a series of radiating pipes or passages 49 of which there is one for each chuck. The fluid passes from the passage 49 through the respective pipes 50 to the valve casing shown more in detail in Figs. 4 and 7.

Each valve is a separate and detachable unit located on the periphery of the turret adjacent its respective chuck. Each valve consists of a main plate 51 which is shaped to conform somewhat with the exterior surface of the turret and having a body portion 52 which is inset into the surface of the turret.

Within the plate 51 is located a rotary valve disk 53 having therein holes 54 and 55 for leading pressure fluid to the opposite ends of the respective cylinder, depending upon the position of the valve. The exhaust takes place through the valve by means of the cutaway portion 56 in the upper surface thereof which allows communication between either end of the cylinder and the exhaust opening 57. The fluid pressure from the valve is led to the left end of the cylinder as it appears in Fig. 1 through outlet 58 which communicates with a pipe 42 heretofore mentioned. The valve communicates with the opposite end of its fluid pressure cylinder through outlet 59 communicating with pipe 43.

The valve is manually operated, that is given an oscillatory movement by means of the handle 60 which is connected to the oscillatory valve disk 53 by means of a short stub shaft extending through the cover-plate 61 in which are located the various passages leading to the cylinder and to the exhaust.

The pipes 42 and 43 are made readily detachable to enable the cylinder 26 to be removed from the turret. If desirable the pipe 43 can be made a part of the chucking unit with a length corresponding to the length of the cylinder.

As is shown most clearly in Fig. 3 the valves including the lever 60 for operating them are shaped to conform with the outer surface of the turret and the valve casing is partially countersunk therein in order to reduce the outer diameter of the turret and in general resulting in a very compact construction and one in which there are few projecting parts to catch on clothing or any other objects which may be located near the machine during the operation thereof.

Having described the elements, a brief statement of the operation of the machine will be given. Referring particularly to Fig. 4 if the lever 60 be moved clockwise it may be seen that the groove 56 allows communication between the passage 58 and the exhaust opening 57. At the same time the port 55 will be in a position to permit communication between the chamber in the lower part of the valve casing and the pipe connection 59 leading through the pipe 43 to one end of the cylinder thereby causing the piston to assume a position at one end of its throw or some intermediate position if the arrangement is such that the jaws come into engagement with the stock or tool to be held thereby.

Movement of the lever in a counterclockwise direction reverses the stroke of the piston and moves the chuck jaws in the opposite direction. With the present type of chuck the jaws may be used for either internal or external chucking and the holding power will be equally strong in either direction.

It is to be understood that the particular means for engaging the stock and the gearing for moving the engaging members is not limited to the specific type shown.

The levers for operating the individual chucks are arranged in a position readily accessible to the operator without making it necessary for him to move from his ordinary position before the machine. Since after the movement of the lever 60 the remainder of the chuck operation is automatic, the operator is left free to manipulate the stock grasped by the jaw or to operate the next chuck or to perform any of the many other operations attendant upon the operation of such a machine tool.

If for any reason, it becomes desirable or necessary to operate the chucks manually a nut or squared end 61 is provided for the application thereto of the ordinary wrench.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. In a machine tool, a turret having a working face with an opening therethrough extending into said turret; a chucking unit, adapted to be mounted in said opening, said unit comprising chucking jaws and fluid pressure operating means therefor adapted to be mounted within said opening, said operating means comprising a cylinder, piston means therein, and operating connections from said piston means to said jaws, said opening being of sufficient depth whereby cylinders of various lengths may be used to allow various length piston strokes whereby the operating range of the jaws may be substantially varied.

2. In a machine tool, an index table having a working face and with an opening therethrough extending into said table; a chucking unit comprising chucking jaws and fluid pressure means connected thereto for operating said jaws, said means adapted to be mounted within said opening; and means for removably mounting said jaws on said working face, whereby the unit may be conveniently removed without disturbing the remaining structure.

3. A rotary turret for machine tools adapted to rotate about a central axis comprising a cylindrically shaped member having a working face substantially at right angles to the axis, and having an opening therethrough extending into said member; a chuck unit adapted to be mounted in said opening, said unit comprising chucking jaws, fluid pressure means for operating said jaws and brackets for supporting said unit integral therewith at an intermediate portion whereby said operating means are positioned within said cylindrical member; and means engageable with said brackets for fastening the unit to the working face whereby the unit is made readily removable.

4. In a machine tool, a rotary turret having a working face and having an opening therethrough extending into said turret; a chucking unit comprising chucking jaws and fluid pressure operating means connected to said jaws; fluid pressure control means for said unit mounted on the periphery of said turret; and means for mounting said unit in said opening whereby the unit may be removed as a whole without disturbing the adjacent structure or the control means.

5. In an indexing mechanism, an index head comprising a hollow drum shaped member having a working face with a plurality of openings therethrough extending into said drum; a chucking unit removably mounted in each of said openings, each unit including fluid pressure means for operating said unit; and a control valve for each unit mounted on the periphery of said drum.

6. In a machine tool, a rotary turret comprising a cylindrically shaped member having a flat working face with a plurality of openings therethrough extending into said member; chucking units removably mounted in each opening, each unit including fluid pressure operated means; and a control means for each unit comprising a flat valve body arranged in the cylindrical surface of said member and being substantially arc-shaped to conform with the contour thereof.

7. In a machine tool, a rotary turret, said turret having a working face with a plurality of openings therethrough extending into said turret; a chucking unit removably mounted on said face and each unit including fluid pressure operating means therefor extending into said opening; a central driving shaft extending from said turret having an axial passage therethrough for fluid pressure; a control valve for each unit; and fluid pressure connections from each control valve to said axial passage and from each control valve to its respective chucking unit.

8. In a machine tool, a rotary turret comprising a cylindrically shaped substantially hollow member having a working face and an opening therethrough into said hollow member; a chucking unit adapted to be mounted in said opening, said unit comprising chucking jaws, means for mounting said jaws on said face, a cylinder connected to said means adapted to extend into said hollow member and piston means in said cylinder connected to operate said jaws; a central shaft extending from said cylindrical member having an axial passage for fluid pressure extending therethrough into said turret; a control valve for said unit mounted on said turret; and fluid connections from said axial passage to said valve and from the valve to said cylinder.

9. A machine tool combining a substantially cylindrical member rotatively mounted thereon and having a working face transverse to the axis thereof; a chucking unit mounted in an opening in said working face, said unit including fluid pressure operating means therefor; and a control means for said unit comprising a flat valve body arranged in the cylindrical surface of said member to substantially conform with the contour thereof.

10. A machine tool combining a rotary turret having a working face with an opening therein; and a chucking unit adapted to be removably mounted in said opening comprising grasping means, and fluid pressure cylinder and piston means for operating said grasping means, said opening being of sufficient depth whereby cylinders and piston means for various lengths may be employed to provide correspondingly different lengths of piston strokes and thereby different ranges of movement of the grasping means.

11. A machine tool combining a rotary turret having a working face with an opening therein extending into said turret; and a chucking assembly comprising grasping means and fluid pressure operating means therefor, said assembly being adapted to be mounted on the turret and removable therefrom as a unit with the grasping means secured on the working face and the fluid pressure operating means extending through said opening into the turret, said opening being of sufficient depth whereby units may be employed having variously sized fluid pressure operating means to give correspondingly different ranges of movement to the grasping means.

12. A machine tool combining a rotary turret having a working face with an opening therein extending into said turret; and a chucking assembly comprising grasping means, and a fluid pressure cylinder and piston means for operating the grasping means, said assembly being adapted to be mounted in said turret opening and removable therefrom as a unit, said cylinder and piston means being detachable from said chucking assembly and capable of being replaced by cylinder and piston means of different lengths whereby correspondingly different ranges of movement may be imparted to said grasping means.

In witness whereof, I have hereunto subscribed my name.

JOSEPH JOHN SPRING.